June 23, 1970     R. M. SCRIVER     3,516,476
ELECTRODE AND METHOD OF IMPROVING SOUNDNESS OF INGOTS
Filed April 25, 1968
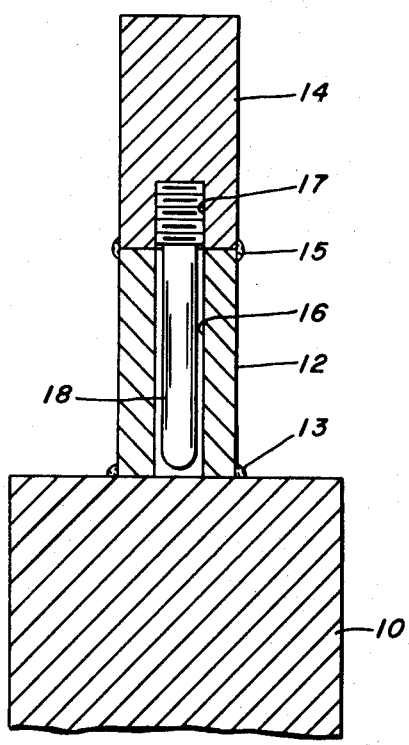
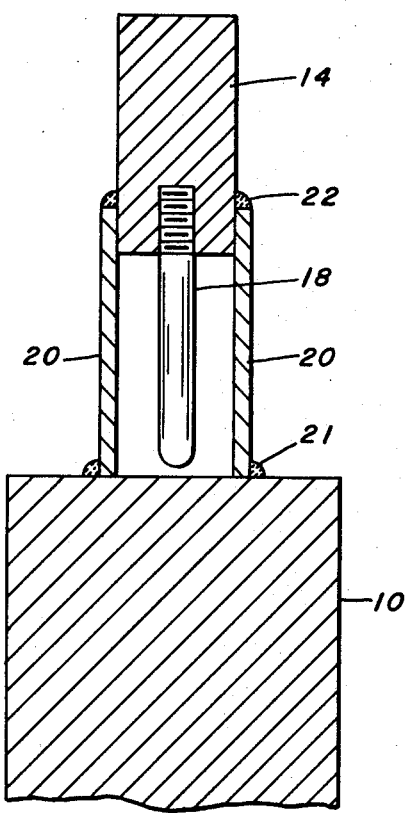
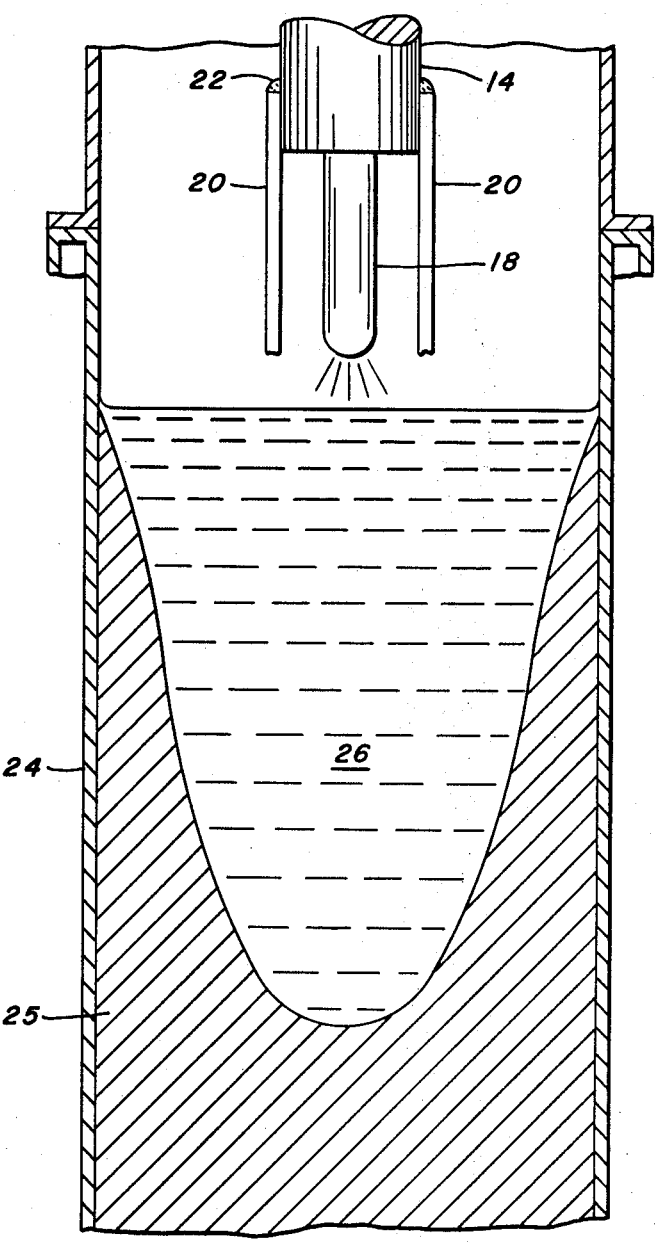
INVENTOR.
RICHARD M. SCRIVER
By Walter P. Hood
Attorney

United States Patent Office 3,516,476
Patented June 23, 1970

3,516,476
ELECTRODE AND METHOD OF IMPROVING SOUNDNESS OF INGOTS
Richard M. Scriver, North Jackson, Ohio, assignor to Reactive Metals, Inc., a corporation of Delaware
Filed Apr. 25, 1968, Ser. No. 724,101
Int. Cl. B22d 23/06
U.S. Cl. 164—52                                          7 Claims

ABSTRACT OF THE DISCLOSURE

A method of improving the soundness of ingots produced in a consumable-electrode melting process and a specially constructed electrode for use in such processes. The electrode has a non-consumable auxiliary electrode suspended above its body. At the end of the melting operation, an arc of reduced current is maintained between the auxiliary electrode and the top of the ingot to control final solidification of the ingot. Produces an ingot having a flat upper surface.

---

This invention relates to a method of improving the soundness of ingots formed in a consumable-electrode melting process, and to improved electrodes for use in such processes.

In a conventional consumable-electrode melting process, an electrode is suspended above a water-cooled electrically conductive mold. An electric arc is struck between the bottom of the electrode and a "starting pad" of conductive material in the mold. The electrode melts and drips into the mold, where an ingot gradually builds up. The operation is conducted either in an inert atmosphere or in a vacuum; that is, gases which would react with the metal are excluded. Such processes are particularly useful for producing ingots of highly reactive metals, such as titanium and zirconium, from electrodes formed of compacted sponge metal or from an ingot formed in a previous stage melting.

In common with other processes for casting ingots, there is a problem that a "pipe" tends to form as the ingot solidifies. The "pipe" is a cavity at the top of an ingot caused by shrinkage which takes place as metal goes from a liquid to a solid state. Impurities tend to segregate it the bottom of the pipe. Cavities in ingots produced in a consumable-electrode melting process may be eliminated by heavy hot-working, but usually the end of the ingot is cropped to eliminate the portion which contains the pipe. Conventional refractory "hot tops," which are used to minimize the pipe or improve the soundness of steel ingots, are not suitable for ingots formed in a consumable-electrode melting process.

An object of my invention is to provide a "hot-topping" method of improving the soundness of ingots formed in a consumable-electrode melting process.

A further object is to provide a method of controlling solidification of the upper portion of such an ingot after the rest of the ingot solidifies through use of a non-consumable auxiliary electrode.

A further object is to provide an improved consumable electrode for use in a melting process, which electrode embodies a non-consumable auxiliary electrode to control solidification of an ingot formed therefrom.

In the drawing:

FIG. 1 is a vertical sectional view of an electrode constructed in accordance with my invention;

FIG. 2 is a similar view showing a modification; and

FIG. 3 is a diagrammatic vertical sectional view illustrating the action of the auxiliary electrode in controlling solidification of the ingot at the end of a melting operation.

FIG. 1 shows an electrode which includes a consumable body 10, a meltable header section 12 welded to the top of the body as indicated at 13, and a reusable header section 14 welded to the top of section 12 as indicated at 15. The meltable header section 12 has a bore 16 which extends from top to bottom. The lower end of the reusable header section 14 has a tapped bore 17. A non-consumable auxiliary electrode 18 is threadedly engaged with the reusable header section in its bore 17 and extends downwardly through the bore 16 of the meltable header section. The auxiliary electrode terminates just above the top of body 10. The two header sections are of the same composition as the body, while the auxiliary electrode is of any suitable known composition for a non-consumable electrode. Carbon or graphite auxiliary electrodes are suitable for use with consumable electrodes of titanium or titanium alloys.

FIG. 2 shows a modification in which the connecting means between the ingot body 10 and the reusable header section 14 are in the form of symmetrically arranged meltable members 20. I show these members as opposed flat plates, but other configurations, such as rods, could be used. Members 20 are welded to the top of the body 10 and to the lower portion of the reusable header section 14, as indicated at 21 and 22, respectively. The auxiliary electrode 18 extends downwardly from the reusable header section between these members. Again members 20 are of the same composition as body 10. This modification offers the advantage that the auxiliary electrode is visible and I can observe its action.

FIG. 3 shows diagrammatically a water-cooled mold 24 which contains a partially solidified ingot 25 approaching the end of a melting operation. The ingot has a pool 26 of molten metal at its top. The body of the electrode has been fully consumed, along with portions of the connecting means 12 or 20. The reusable header section 14, auxiliary electrode 18, and the remainder of the connecting means remain suspended above the ingot. When the body was finally consumed, the melting arc transferred to the auxiliary electrode 18 and only the bottom portion of the connecting means actually melts. At this stage I lower the arc current to a minimum needed to sustain an arc. For example, I may use an arc current of about 36,000 amperes to melt the body, but I now lower this to as little as about 1,000 amperes. In this manner I allow the pool 26 to solidify slowly and form a flat surface at the top of the ingot. Thus the ingot is completely sound and devoid of pipe. The low arc current produces a minimum of contamination in the ingot from the auxiliary electrode, and any contamination is confined to a very shallow region at the top of the ingot.

While I have shown and described only certain preferred embodiments of my invention, it is apparent other modifications may arise. Therefore, I do not wish to be limited to the disclosure set forth, but only by the scope of the appended claims.

I claim:

1. An electrode for use in a consumable electrode melting process comprising a consumable metal body, a first header section, meltable connecting means fixed to said header section and to the top of said body, and a non-consumable auxiliary electrode carried by the lower end of said header section and extending downwardly through said connecting means and terminating above the top of said body.

2. An electrode as defined in claim 1 in which said body, said header section and said connecting means are of the same metal composition and said auxiliary electrode is of carbon or graphite.

3. An electrode as defined in claim 2 in which said connecting means is in the form of second header section welded at its ends to said body and to said first header section and having a bore from top to bottom through which said auxiliary electrode extends.

4. An electrode as defined in claim 2 in which said connecting means is in the form of symmetrically spaced members welded at their ends to said body and to said header section, said auxiliary electrode being visible between said members.

5. In a consumable-electrode melting process in which a consumable metal electrode body is suspended from a header into a mold, the body is melted with an electric arc, an ingot builds up in the mold and solidifies, and the body is fully consumed leaving the header above the ingot, the improvement wherein a non-consumable electrode is suspended from the header above the body, and wherein an electric arc is maintained between said non-consumable electrode and the top of the ingot after the electrode body has been consumed during the final stages of solidification of the ingot.

6. A method as defined in claim 5 in which said consumable electrode is titanium or a titanium-base alloy and said non-consumable electrode is carbon or graphite.

7. A method as defined in claim 5 in which the arc current is materially lowered when maintained from said non-consumable electrode.

References Cited

UNITED STATES PATENTS

| | | | |
|---|---|---|---|
| 2,191,481 | 2/1940 | Hopkins | 164—52 |
| 2,191,482 | 2/1940 | Hopkins | 164—52 |
| 2,600,823 | 6/1952 | Zaccagnini | 164—52 X |

ROBERT D. BALDWIN, Primary Examiner

U.S. Cl. X.R.

13—18; 164—252